(12) United States Patent
Zbeda (10) Patent No.: US 8,761,575 B2
(45) Date of Patent: Jun. 24, 2014

(54) METHOD AND APPARATUS FOR SEARCHING REPLAY DATA

(75) Inventor: Amir Zbeda, San Diego, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 898 days.

(21) Appl. No.: 12/421,529

(22) Filed: Apr. 9, 2009

(65) Prior Publication Data
US 2010/0260487 A1    Oct. 14, 2010

(51) Int. Cl.
*H04N 9/80*       (2006.01)
*A63F 13/00*      (2014.01)

(52) U.S. Cl.
CPC .......... *A63F 13/00* (2013.01); *A63F 2300/634* (2013.01)
USPC ............. 386/248; 463/42; 717/106; 725/9; 715/757

(58) Field of Classification Search
CPC ........................................ A63F 13/00
USPC ..................................... 386/248
See application file for complete search history.

(56) References Cited

U.S. PATENT DOCUMENTS

| | | | |
|---|---|---|---|
| 6,226,785 B1* | 5/2001 | Peterson et al. | 717/106 |
| 2002/0120925 A1* | 8/2002 | Logan | 725/9 |
| 2004/0111488 A1 | 6/2004 | Allan | |
| 2004/0111727 A1 | 6/2004 | Schwarzbauer et al. | |
| 2006/0046854 A1 | 3/2006 | Arevalo Baeza et al. | |
| 2006/0149781 A1 | 7/2006 | Blankinship | |
| 2007/0106660 A1 | 5/2007 | Stern et al. | |
| 2007/0172194 A1* | 7/2007 | Suzuki | 386/52 |
| 2007/0185926 A1* | 8/2007 | Prahlad et al. | 707/202 |
| 2007/0248313 A1* | 10/2007 | Kageyama | 386/55 |
| 2008/0096663 A1* | 4/2008 | Lieberman et al. | 463/42 |
| 2009/0249227 A1* | 10/2009 | Clark et al. | 715/757 |

OTHER PUBLICATIONS

Flat file database. (May 17, 2013). In Wikipedia, The Free Encyclopedia. Retrieved 14:07, May 27, 2013, from http://en.wikipedia.org/w/index.php?title=Flat_file_database&oldid=555582782.*

Patent Cooperation Treaty; "Notification of Transmittal of the International Search Report and the Written Opinion of the International Searching Authority or the Declaration" issued in corresponding PCT/US10/30005; mailed Jun. 1, 2010; 2 pages.

Patent Cooperation Treaty; "International Search Report" issued in corresponding PCT/US10/30005; mailed Jun. 1, 2010; 2 pages.

Patent Cooperation Treaty; "Written Opinion of the International Searching Authority" issued in corresponding PCT/US10/30005; mailed Jun. 1, 2010; 7 pages.

* cited by examiner

*Primary Examiner* — Taghi Arani
*Assistant Examiner* — Syed Zaidi
(74) *Attorney, Agent, or Firm* — Fitch, Even, Tabin & Flannery, LLP (57) ABSTRACT

A method for use with a computer simulation includes generating metadata that corresponds to replay data, and storing the generated metadata in a searchable text file. The replay data is generated in response to an execution of the computer simulation, and the metadata includes textual descriptions of one or more events that occurred during the execution of the computer simulation. A computer-readable storage medium stores a computer program for use with a computer simulation, and an apparatus includes a processor based system.

15 Claims, 7 Drawing Sheets

METHOD AND APPARATUS FOR SEARCHING REPLAY DATA

BACKGROUND OF THE INVENTION

1. Field of the Invention

The present invention relates generally to method and apparatus for use in computer simulations, and more specifically to searching replay data generated during a computer simulation.

2. Discussion of the Related Art

With the increased popularity of computer games, such as video games, there has been a great interest in replay features available to users. Currently, users can record and replay events that occur during a computer game. Single-user and Multi-user video games offer the user the option of viewing events that occurred during the game at a later time using these replay features.

SUMMARY OF THE INVENTION

In one embodiment, the invention can be characterized as a computer-readable storage medium storing a computer program adapted to cause a processor based system to execute steps comprising generating metadata that corresponds to replay data, wherein the replay data is generated in response to an execution of the computer simulation and wherein the metadata includes textual descriptions of one ore more events that occurred during the execution of the computer simulation, and storing the generated metadata in a searchable text file.

In another embodiment, the invention can be characterized as a method for use with a computer simulation comprising generating metadata that corresponds to replay data, wherein the replay data is generated in response to an execution of the computer simulation and wherein the metadata includes textual descriptions of events that occurred during the execution of the computer simulation, and storing the generated metadata in a searchable text file.

In a further embodiment, the invention may be characterized as an apparatus, comprising a processor based system that includes a processor and a memory, wherein the processor based system is configured to generate metadata that corresponds to replay data and store the generated metadata in a searchable text file. The replay data is generated in response to an execution of the computer simulation, and the metadata includes textual descriptions of one ore more events that occurred during the execution of the computer simulation.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Embodiments of the present invention are described with respect to a computer game, such as a video game. However, it should be understood that the system and method described herein is capable of being used with any computer simulation and/or media playback system having one or more events having information that can be played back to a user. Further, it should be understood that the game or simulation can be a single or multiplayer game or simulation.

Previous systems and approaches provide for replay of events that occur during computer games. For example, a user can record events that occur during game play, and playback the events at a later time. However, these systems do not provide for control and flexibility for searching and replay of the binary replay data. The user in these systems can only search, and play back, replay data in the exact format previously recorded, and the systems do not provide for granularity and flexibility when searching for and playing back replay data.

Furthermore, while some current systems include metadata along with the binary replay data to add some search functionality, in these systems metadata is stored as fields in a database, such as artist name or song name. Accordingly, searching of replay data is restrictive because all the metadata fields have to be added to the database prior to deployment of the game. Further, because the size and structure of the replay data is predefined, the game developers are not provided with flexibility in creating metadata for the game.

Present embodiments recognize a need for more flexibility and control over playback of replay data, and further recognize the need for more granularity with respect to searching the stored replay data. Further, some embodiments provide for more flexibility in terms of creating metadata corresponding to replay data.

Accordingly, some embodiments provide a system and method for using replay metadata in a search engine friendly format such as a text file accompanying the binary file to allow for greater control and flexibility over the binary replay data. For example, in some embodiments the user and/or game developer is given more control over creating metadata by using a text file to allow the game user and/or developer to add or modify the structure of metadata even after deployment, allowing for flexibility in computer games. For example, in one embodiment games that have user generated content are provided with flexibility in creating metadata that correspond to replay data. The system provides the developer with much more flexibility in creating metadata because the text metadata does not require a specific database structure. Further, by allowing the user and/or the developer to save events as they occur in the game and store them the user and/or developer is provided with more control over the game.

Further, some present embodiments provide a powerful search of the replay data by providing a method and apparatus for creating text metadata that is stored along with the binary metadata in a searchable text file that can be searched using existing search engines.

Figure 1:
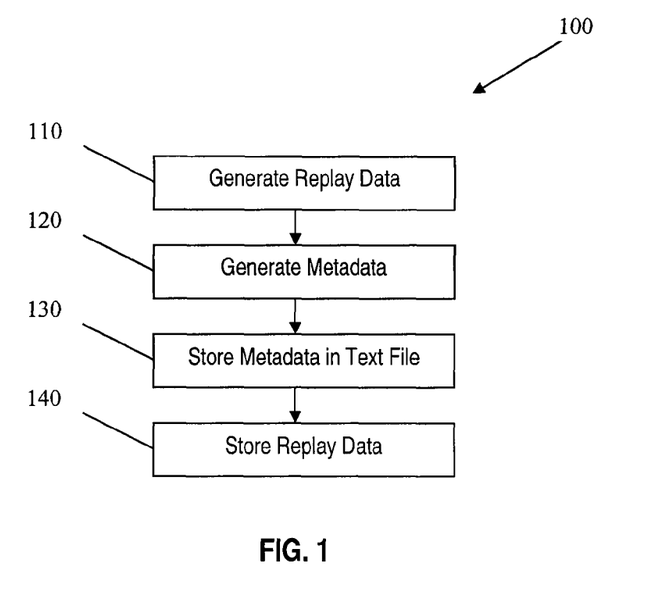
FIG. 1 illustrates a flow diagram of a method, according to one embodiment, for generating and storing metadata and replay data.

Referring to FIG. 1, there is illustrated a method 100 that operates in accordance with an embodiment of the present invention. The method 100 begins in step 110 in which replay data corresponding to events that occur during a game play is generated. In some embodiments, the replay data may comprise data that can later be played back. In one embodiment, the replay data is played back as a video or audio clip and is a substantial duplicate of the event corresponding to the replay data. As such, the replay data, according to some embodiments, comprises data that can be played back using a playback device to display the event corresponding to the replay data to the user.

In one embodiment, the replay data is generated as events occur during the computer game. In one embodiment, the replay data is generated as the event is being executed. For example, as the user causes an event to occur, method 100 causes replay data to be generated for that event. In an alternate embodiment, after the event is executed the system uses the event information to generate the replay data.

In step 120, metadata corresponding to the replay data is generated. In some embodiments, the metadata includes textual descriptions of events that occurred during the execution of the computer game. In one embodiment, the textual descriptions may be generated using predefined textual descriptions corresponding to the event. For example, the game developers can provide a list of descriptions that correspond to the events that occur during the game. The descriptions may then be automatically generated as the game is played.

In some embodiments, one or more templates may be used to provide a description of the event. That is, when an event occurs, a template is pulled up and then automatically filled in according to what happened during the event. For example, a template may state the following: "Player ________ was ________ by Player ________". When an event occurs the server automatically generates a description of the event by filling in the template, such as like the following examples: "Player 1 was shot by Player 2"; or "Player 4 was killed by Player 3". Thus, the use of templates provides one way that a server can automatically generate textual descriptions of events during game play. The textual descriptions of the events may then be included in the metadata.

In some embodiments, a user can generate a description of an event as it occurs during the game. For example, in some embodiments, the system may allow for user generated simulations, and allow the user to enter a textual description for the event when it is created. However, it should be well understood that having a user enter, type in, or generate a description of an event is optional and is not required.

In some embodiments, the method 100 may be at least partially implemented by a processor based system, such as an entertainment system or game console. In this scenario, the user generated metadata may be received by the processor based system using a keyboard, mouse, gamepad, video game controller, television controls, DVD controls, remote device, or any other suitable selection device.

In one embodiment, the events may be verbal communications between users during a game, and the system 100 may generate replay data of the audio of the verbal communications using speech recognition. The system 100 may transcribe the verbal communication as text metadata and allow for later search of the verbal communication between the users.

In one embodiment, the textual descriptions may be generated as the game is executed. In this scenario the metadata is generated as an event occurs during the game. For example, as a player causes an event to occur, metadata corresponding to that event is generated. In another embodiment, the textual descriptions may be based on the generated replay data corresponding to the event. The metadata may be generated after the replay data has been generated based on the information associated with the replay data. As mentioned above, in some embodiments the textual descriptions of the events may be automatically generated, such as by using the above-described templates. In one embodiment, the metadata may be generated at the processor based system where the game is being played. In other embodiments, the processor based system may transmit the information required to generate the metadata to a remote processor based system, and the metadata may be generated at the remote location.

In one embodiment, metadata may additionally and/or alternatively be generated when a user tags an event. For example, in one embodiment the user may select an event using a user input device to be tagged. In this scenario, the system then generates a textual description of the user tagged event. This may be performed automatically. In some embodiments, the textual description may include a textual indication that the stored event is a tagged event.

In some embodiments, the method 100 may be at least partially implemented by a processor based system such as an entertainment system or game console. In this scenario the user may tag an event using a keyboard, mouse, gamepad, video game controller, television controls, DVD controls, remote device, or any other suitable selection device.

Next, in step 130 the generated metadata is stored. In some embodiments, the generated metadata is stored in a searchable text file. Storing the metadata in a text file allows for greater speed as the search engine is able to focus its search to the text file. This allows for a faster search of the replay data. In some embodiments, the text file may be stored in a file system. Searching of the text file may be implemented by first crawling the text file to create an index, and then once the index is created the system will use the index to perform a fast and efficient search. That is, a search engine may crawl the text file and index it, and then use the index when searching. In some embodiments, the generated metadata may be stored in more than one searchable text file. In this scenario the search engine will crawl through several text files and create indices. A search engine may crawl one by one through several text files. The indices are then used to perform a fast and efficient search.

In some embodiments, the method 100 may be at least partially implemented by a processor based system having a memory, such as an entertainment system or game console. In this scenario the metadata is generated by the processor and stored at the local memory for later retrieval. For example, in one embodiment the textual descriptions corresponding to the replay data and/or the computer game is written to a text file present in the memory at the system where the game is played. In another embodiment, the metadata is generated at the processor and transmitted to a remote database and stored at the remote database for later retrieval. For example, the metadata may be stored at a text file stored at a remote database. It should be well understood, however, that the text file does not have to be stored in a database. Again, storing the metadata in a text file allows for greater speed as the search engine is able to focus its search to the text file, which allows for a faster search of the replay data.

Figure 4:
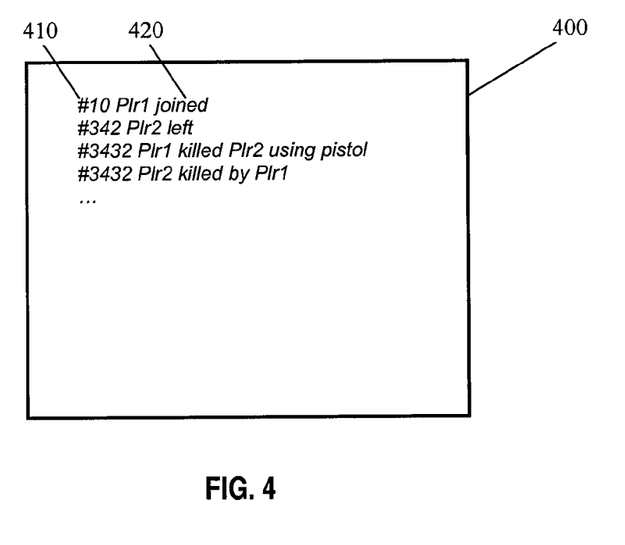
FIG. 4 illustrates an exemplary illustration of the searchable text file containing the metadata.

In some embodiments, frame numbers corresponding to the location of the event or replay data corresponding to the metadata may be retrieved or generated and stored with the metadata in the text file. For example, FIG. 4 illustrates an example of a text file 400 containing a plurality of metadata corresponding to one or more events. As shown in FIG. 4, the text file 400 contains textual descriptions 420 and frame numbers 410. In another embodiment, time references corresponding to the temporal location of an event or frame may be stored along with the metadata in the text file. Using a frame number and/or time reference in the text file allows for powerful navigation of the replay file. Checking attributes such as frame number or the temporal location of a certain event allows the user to play back only portions of the replay data that are of particular interest to the user. This also allows for greater granularity in the search of replay data not available with current replay features.

In step 140 (FIG. 1), the replay data is stored. In some embodiments the replay data is stored into a binary file. The binary file may be stored anywhere. For example, in some embodiments the binary file may be stored in a file system. A pointer system may be used to point to the location of the binary file.

In some embodiments, the replay data may be stored into local memory at the playback device where the game is being played. In some embodiments, the replay data may be stored in a database. For example, the system may transmit the replay data to a remote database as the events occur. In another embodiment, the system may store the replay data locally, and transfer the replay data to the remote database after the termination of a game session. It should be well understood, however, that the replay data does not have to be stored in a database.

In some embodiments, a second set of metadata is also generated and stored with the replay data in the binary file. For example, in one embodiment, the second set of metadata comprises basic information about the replay data including the title, author, etc. In one embodiment the second set of metadata contains the information necessary for retrieval of the replay data from the binary file. In one or more embodiments, the second set of metadata is different from the textual metadata generated and provides an alternative method of searching for the replay data.

In some embodiments, step 120 may occur before step 110, or steps 110 and 120 may occur simultaneously. Similarly, in some embodiments, steps 130 and 140 may occur simultaneously or step 140 may occur before step 130.

Figure 2:
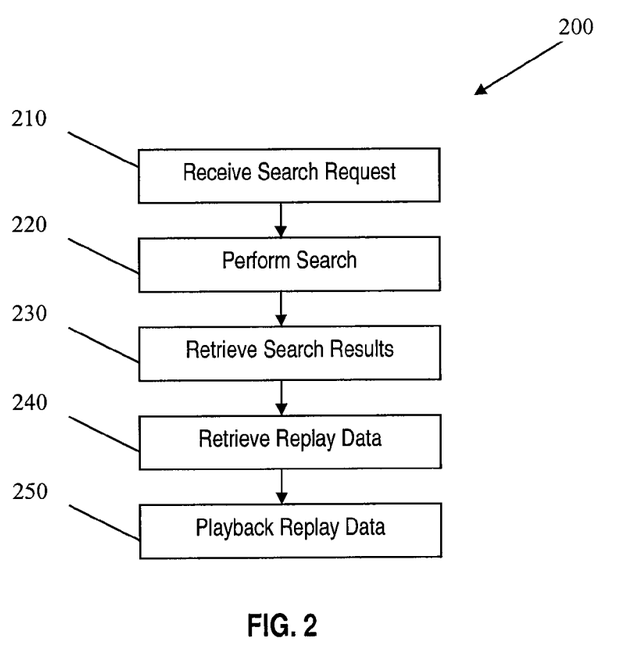
FIG. 2 illustrates a flow diagram of a method, according to some embodiments, for searching the replay data using the metadata.

FIG. 2 depicts a method 200 for searching metadata and replay data after it has been generated and stored according to one or more embodiments described above. For example, the method 200 may be used to search the text file that includes the generated metadata. In step 210 a search request is received. In one embodiment the search request may comprise a text entry entered by a user through a user input device. In another embodiment, a list of possible search options may be displayed to the user, and the user is able to select one of the search options as the search request.

Figure 5:
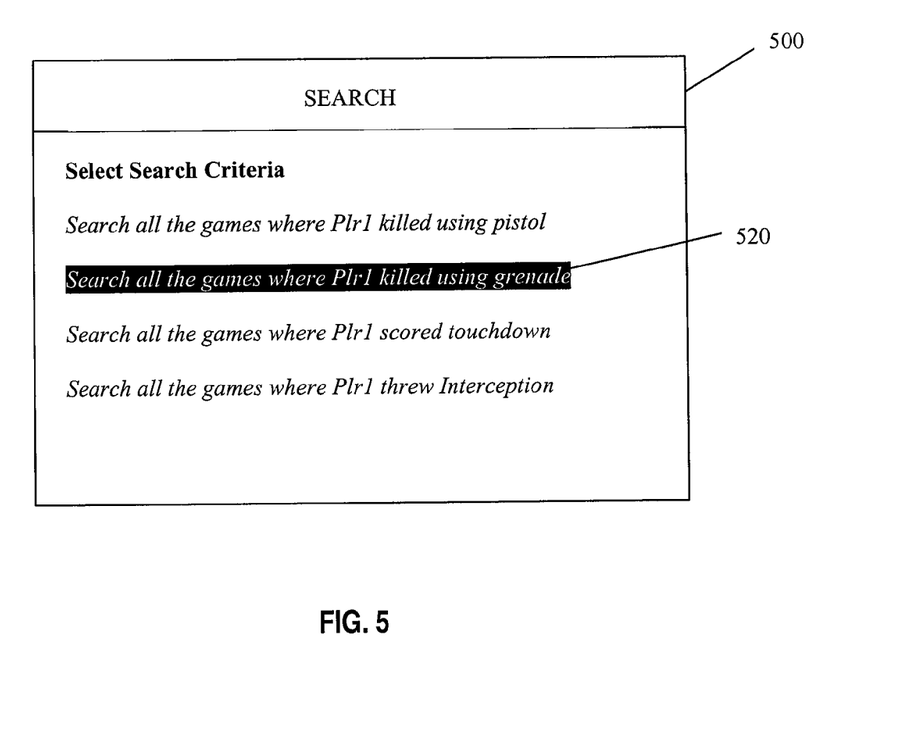
FIG. 5 illustrates an exemplary illustration of a search window displayed to the user.

For example, FIG. 5 is an exemplary embodiment of a display 500 displaying a list of possible search options to the user. As illustrated, the user can select from among the possible search criteria. The search option 520 is shown as being selected.

In one embodiment, the method 200 (FIG. 2) may be at least partially implemented by a processor based system, such as an entertainment system or a game console. In this scenario the search request may be entered or selected using a keyboard, mouse, gamepad, video game controller, television controls, DVD controls, remote device, or any other suitable input device.

In some embodiments, the search request may be in a text format and may be a description of an event, a statistical query, a category search, etc. For example in one embodiment the user may enter or select on of the following searches:

"Search of all the games where Plr2 killed by Plr1"
"Search all the games where Plr1 killed using pistol"
"Search all the games where Plr1 killed using grenade"
"Search all the games where Plr1 scored touchdown"
"Search all the games where Plr1 threw Interception"
"Search how many times player1 played terrible appears"

In one embodiment the search options available to the user depend upon the amount of data that the game developer chooses to store.

Next in step 220, a search is performed according to the entered search request. In some embodiments, the search may be implemented using an already known search engine such as, for example, GOOGLE™ or ORACLE™. It should be understood, however, that any suitable search engine may be used, including other known search engines or search engines designed or configured for one or more of the embodiments disclosed herein. As mentioned above, in some embodiments the text file may be stored in a file system and the searching of the text file may be performed by using an index that is created by crawling the text file. That is, the search engine will crawl the text file and index it. If the generated metadata is stored in more than one searchable text file, the searching may be performed by using indices that are created by crawling through several text files one by one.

In some embodiments, the search can occur locally at the system where the user enters the search criteria. In some embodiments, the search request may be transmitted to a remote location, where the metadata is stored in a remote database, and the search is performed remotely. It should be well understood, however, that the text file does not have to be stored in a database.

In step 230 the results of the search are retrieved. In one embodiment where the search is performed remotely, the system may receive the search results after the search is complete. In some embodiments, the search results may comprise a list of metadata that satisfy the search request entered by the user. In other embodiments, the search results may comprise the result of a statistical query.

Next in step 240, the replay data that correspond to the retrieved metadata are retrieved from the binary file. In one embodiment, the replay data will be retrieved from a local database. In another embodiment, the replay data will be retrieved from a remote database stored in local memory. In one embodiment, the search results comprise metadata, and the replay data retrieved comprises the replay data corresponding to that metadata. In another embodiment where the search results comprise the result to a statistical query, the retrieved replay data may comprise all metadata that correspond to the statistical query. For example, in one embodiment the player may enter a search request to determine how many times 'player1 played terrible' appears. In this scenario, the search results may comprise the number of times "player 1 played terrible' appears in the entire text file containing the metadata. In this embodiment, the replay data corresponding to the search result may comprise all replay data the correspond to events where 'player 1 played terrible' appears.

In one embodiment, the replay data will be retrieved according to the frame number and/or time reference associated with the retrieved metadata. For example, each metadata in the search results may correspond to a portion of a replay data starting at a certain frame and/or temporal location.

In step 250, the replay data is played back at the playback device. For example, in one embodiment the playback may result in displaying a media clip of the event corresponding to the metadata and the replay data to the user.

In one embodiment, the playback may further comprise aggregating the retrieved replay data to create a clip. The clip is then played back for the user. For example, in some embodiments where a statistical search is performed the system may aggregate all of the replay data corresponding to the queried event and play back the aggregated replay data.

Figure 3:
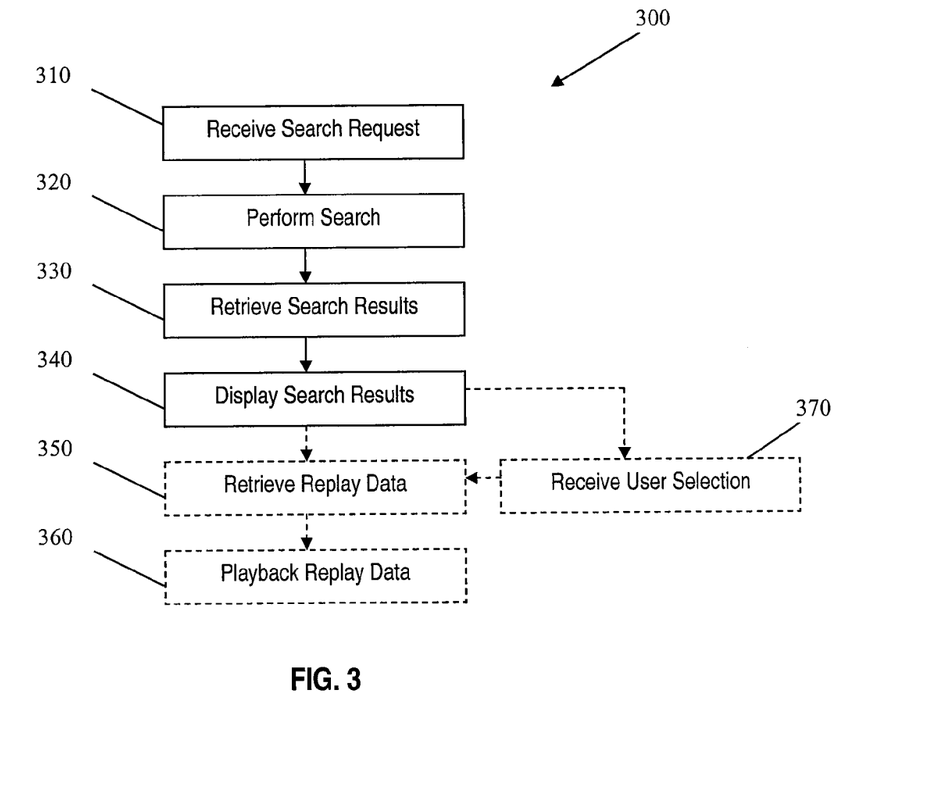
FIG. 3 illustrates a flow diagram of a method, according to some embodiments, for searching the replay data using the metadata.

Referring next to FIG. 3, an alternate method for searching the replay data is illustrated. Steps 310, 320 and 330 are similar to steps 210, 220 and 230 described above with respect to FIG. 2. In step 310 a search request is received, next in step 320, a search is performed according to the entered search request, and in step 330 the results of the search are retrieved according to embodiments described with respect to step 210, 220, and 230 above.

In step 340 the search results retrieved in step 330 are displayed to the user through the user interface. For example, in one embodiment the search results may be displayed to the user as text. In some embodiments, the process will end at step 340 after the search results comprising the retrieved metadata are displayed to the user. In another embodiment, the process will continue onto step 350 where the replay data corresponding to the retrieved search results is retrieved.

In one embodiment, the replay data will be retrieved from a local database. In another embodiment, the replay data will be retrieved from a remote database. In one embodiment, the search results comprise metadata and the replay data retrieved comprises the replay data corresponding to that metadata. In another embodiment where the search results comprise the result to a statistical query, the retrieved replay data may comprise all metadata that correspond to the statistical query. For example, in one embodiment the player may enter a search request to determine how many times 'player1 played terrible' appears. In this scenario, the search results may comprise the number of times "player 1 played terrible' appears in the entire text file containing the metadata. In this embodiment, the replay data corresponding to the search result may comprise all replay data that correspond to events where 'player 1 played terrible' appears.

In one embodiment, the replay data will be retrieved according to the frame number and/or time reference associated with the retrieved metadata. For example, each metadata in the search results may correspond to a portion of a replay data starting at a certain frame and/or temporal location.

In some embodiments, the process then continues on to step 360. In step 360, the retrieved replay data is played back at the playback device. For example, in one embodiment the playback may result in displaying a media clip of the event corresponding to the metadata and the replay data to the user.

In one embodiment, the playback may further comprise aggregating the retrieved replay data to create a clip. The clip is then played back for the user. For example, in some embodiments where a statistical search is performed the system may aggregate all of the replay data corresponding to the queried event and playback the aggregated replay data.

In a further embodiment, in step 340 a list of the search results may be displayed to the user, for example, containing text strings describing the events. The user may then select one or more of the displayed search results using a user input device. In another embodiment, the user may enter a further search selection to filter the search results further. In this embodiment, the system may then continue to step 350 where the replay data corresponding to the search results selected by the user is retrieved and then to step 360 where the retrieved replay data is displayed to the user as described.

In some embodiments, the method 100 may be at least partially implemented by a processor based system, such as an entertainment system or game console. In this scenario, the user selection and search requests will be entered by the user and received by the processor based system using a keyboard, mouse, gamepad, video game controller, television controls, DVD controls, remote device, or any other suitable selection device.

Figure 6:
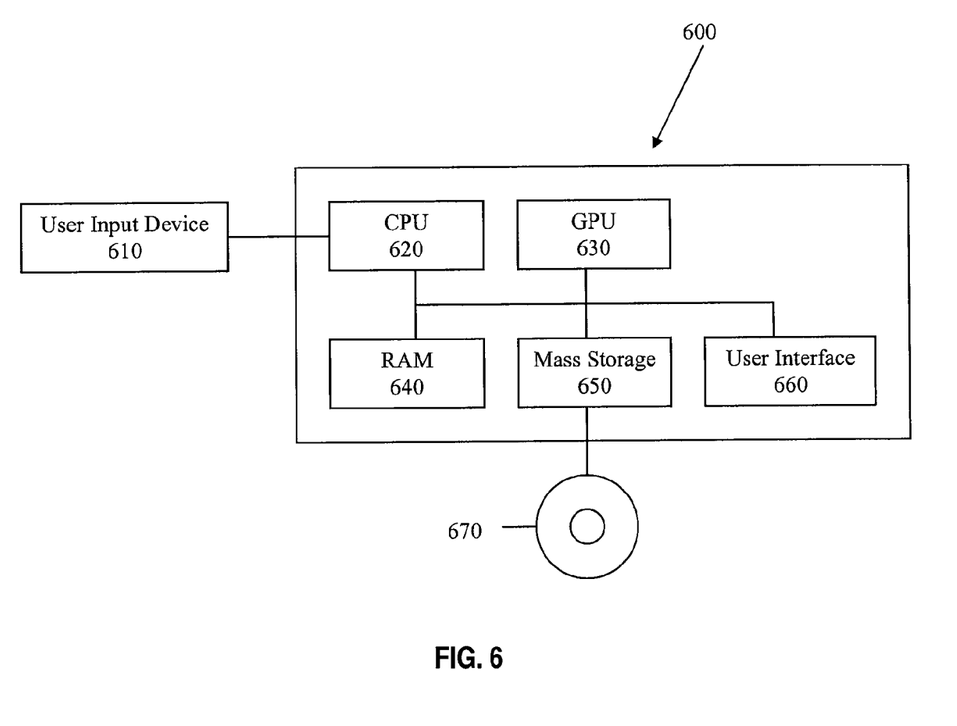
FIG. 6 illustrates a simplified block diagram of a processor based system for implementing the method described in some embodiments.

The methods and techniques described herein may be utilized, implemented and/or run on many different types of systems. Referring to FIG. 6, there is illustrated a system 600 that may be used for any such implementations. One or more components of the system 600 may be used for implementing any system or device mentioned above, such as for example any of the above-mentioned consoles, game consoles, entertainment systems, processor based systems, etc. However, the use of the system 600 or any portion thereof is certainly not required.

By way of example, the system 600 may comprise a Central Processing Unit (CPU) 620, a Graphic Processing Unit (GPU) 630, a Random Access Memory (RAM) 640, a mass storage 650, such as a disk drive, and a user interface 660 such as a display. The CPU 620 and/or GPU 630 may be used to execute or assist in executing the steps of the methods and techniques described herein, and various program content, images, games, simulations, representations, communities, interfaces, etc. may be rendered on the user interface 660. The system 600 may further comprise a user input device 610. The user input device may comprise any user input device such a keyboard, mouse, game controller, etc. The system 600 comprises an example of a processor based system.

The mass storage unit 650 may include or comprise any type of computer readable storage or recording medium or media. The computer readable storage or recording medium or media may be fixed in the mass storage unit 650, or the mass storage unit 650 may optionally include removable storage media 670, such as a digital video disk (DVD), Blu-ray disc, compact disk (CD), USB storage device, floppy disk, or other media. By way of example, the mass storage unit 650 may comprise a disk drive, a hard disk drive, flash memory device, USB storage device, Blu-ray disc drive, DVD drive, CD drive, floppy disk drive, etc. The mass storage unit 650 or removable storage media 670 may be used for storing code that implements the methods and techniques described herein.

Thus, removable storage media 670 may optionally be used with the mass storage unit 650, which may be used for storing code that implements the methods and techniques described herein, such as code for generating and storing the metadata and replay data described above, performing the search, retrieving replay data and displaying the search results. However, any of the storage devices, such as the RAM 640 or mass storage unit 650, may be used for storing such code. For example, any of such storage devices may serve as a tangible computer storage medium for embodying a computer program for causing a console, system, computer, or other processor based system to execute or perform the steps of any of the methods, code, and/or techniques described herein. Furthermore, any of the storage devices, such as the RAM 640 or mass storage unit 650, may be used for storing any needed database(s).

In some embodiments, one or more of the embodiments, methods, approaches, and/or techniques described above may be implemented in a computer program executable by a processor based system. By way of example, such processor based system may comprise the processor based system 600, or a computer, entertainment system, game console, graphics workstation, etc. Such computer program may be used for executing various steps and/or features of the above-described methods and/or techniques. That is, the computer program may be adapted to cause or configure a processor based system to execute and achieve the functions described above. For example, such computer program may be used for implementing any embodiment of the above-described steps or techniques for searching replay data, etc. As another example, such computer program may be used for implementing any type of tool or similar utility that uses any one or more of the above described embodiments, methods, approaches, and/or techniques. In some embodiments, the computer program may comprise a video game, role-playing game (RPG), or other computer simulation. In some embodiments, program code modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides a computer-readable storage medium storing a computer program for use with a computer simulation, the computer program adapted to cause a processor based system to execute steps comprising: generating metadata that corresponds to replay data, and storing the generated metadata in a searchable text file, wherein the replay data is generated in response to an execution of the computer simulation, and wherein the metadata includes textual descriptions of one ore more events that occurred during the execution of the computer simulation.

Figure 7:
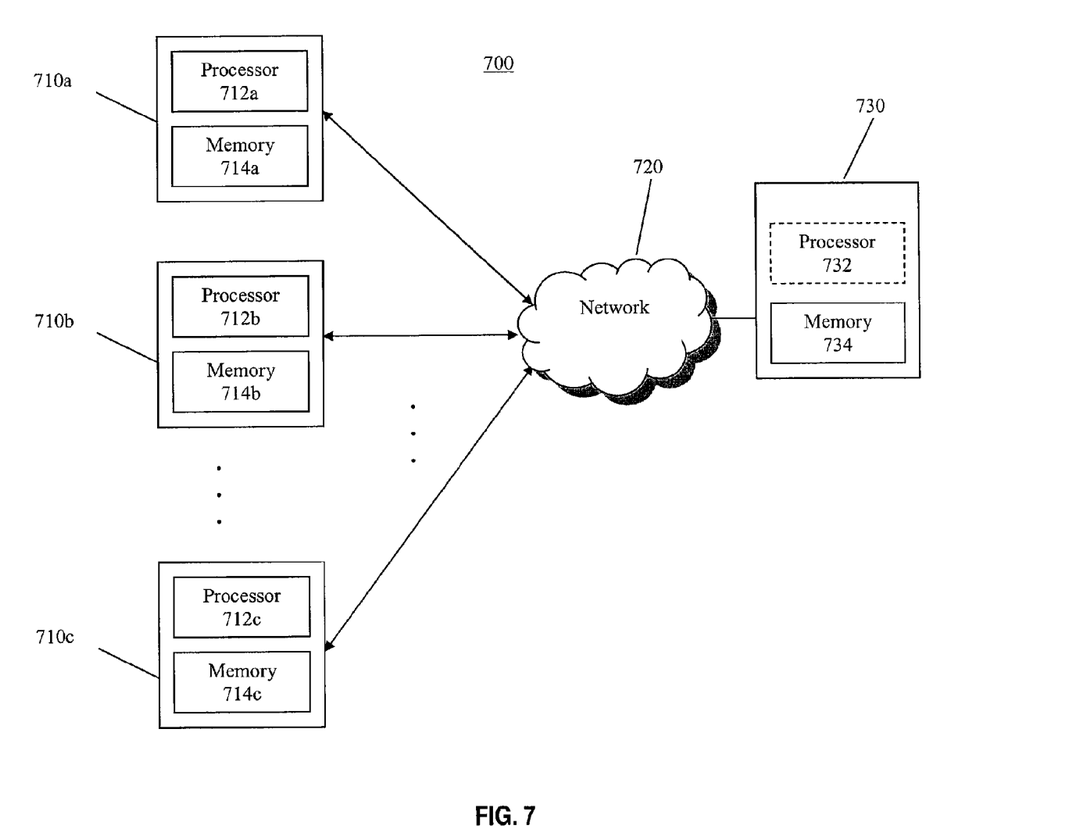
FIG. 7 illustrates an exemplary embodiment of an environment within which the methods and apparatuses of the present application are implemented.

FIG. 7 illustrates an exemplary embodiment of an environment within which the methods and apparatuses of the present application are implemented, for example, in a multiplayer game. The system 700 includes a plurality of local devices 710a, 710b, 710c, a sever device 730, and a network 720. The network 720 couples the local devices 710a, 710b, 710c, to each other and to the server 730. The plurality of local devices 710a, 710b, 710c, are each respectively configured to include a processor 712a, 712b, 712c, coupled to a memory 714a, 714b, 714c, such as random access memory. The server device 730 also includes a processor 732 coupled to a memory 734. In some embodiments the memory 734 may be coupled to or comprise a computer-readable medium. In one embodiment, the processors 712a, 712b, 712c, and/or 732 execute program instructions stored in the computer-readable medium. In some embodiments, the memory 734 may be coupled to one or more additional external or internal devices, such as, without limitation, a secondary data storage element, such as a database. In an alternate embodiment, the memory 734 may serve as a database for storing replay and/or metadata as described above. In some embodiments one or more of the local devices 710a, 710b, 710c and the server device 730 are similar to the processor based system 600 according to FIG. 6 described above.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

While the invention herein disclosed has been described by means of specific embodiments, examples and applications thereof, numerous modifications and variations could be made thereto by those skilled in the art without departing from the scope of the invention set forth in the claims.

What is claimed is:

1. A non-transitory computer-readable storage medium storing a computer program for use with a computer simulation, the computer program adapted to cause a processor based system to execute steps comprising:
   generating metadata that corresponds to replay data, wherein the replay data is generated in response to an execution of the computer simulation, and wherein the metadata includes textual descriptions of one or more events that occurred during the execution of the computer simulation;
   storing the generated metadata in a searchable text file;
   receiving a search request comprising a description of a game event;
   searching for replay data matching the description of the game event using an index created from crawling through a plurality of searchable text files comprising the textual descriptions of one or more events;

generating a result set comprising one or more replay data having metadata that satisfies the search request;
receiving a selection of one or more of the metadata of the result set;
retrieving the replay data corresponding to the selected one or more metadata; and
playing back the retrieved replay data;
wherein the textual descriptions of one or more events are at least partially generated during the execution of the computer simulation; and
wherein the computer simulation comprises a computer game.

2. The computer readable storage medium of claim 1 wherein the receiving a search request comprises receiving a user selection of a search option, wherein the search option is one of a plurality of search options displayed to the user by a playback device.

3. The computer readable storage medium of claim 1 further adapted to cause a processor to execute steps comprising:
retrieving replay data corresponding to each of the one or more metadata of the result set from the database; and
playing back the retrieved replay data.

4. The computer readable storage medium of claim 3, wherein the playing back of the retrieved replay data comprises aggregating the replay data to create a clip, and playing back the clip.

5. The computer readable storage medium of claim 1, wherein the generating the metadata comprises generating a textual description for each of the one or more events of the computer simulation.

6. A method for use with a computer simulation, comprising:
generating, with a processor based apparatus, metadata that corresponds to replay data, wherein the replay data is generated in response to an execution of the computer simulation, and wherein the metadata includes textual descriptions of one or more events that occurred during the execution of the computer simulation;
storing the generated metadata in a searchable text file;
receiving a search request comprising a description of a game event;
searching for replay data matching the description of the game event using an index created from crawling through a plurality of searchable text files comprising the textual descriptions of one or more events;
generating a result set comprising one or more replay data having metadata that satisfies the search request;
receiving a selection of one or more of the metadata of the result set;
retrieving the replay data corresponding to the selected one or more metadata; and
playing back the retrieved replay data;
wherein the textual descriptions of one or more events are at least partially generated during the execution of the computer simulation; and
wherein the computer simulation comprises a computer game.

7. The method of claim 6, further comprising:
associating a frame number with the metadata, wherein the frame number corresponds to a location of the replay data corresponding to the metadata; and
wherein the storing the generated metadata further comprises storing the frame number with the generated metadata.

8. The method of claim 6, wherein the receiving a search request comprises receiving a user selection of a search option, wherein the search option is one of a plurality of search options displayed to the user by a playback device.

9. The method of claim 6, further comprising:
retrieving replay data corresponding to each of the one or more metadata of the result set from the database; and
playing back the retrieved replay data.

10. The method of claim 9, wherein the playing back of the retrieved replay data comprises aggregating the replay data to create a clip, and playing back the clip.

11. The method of claim 6, further comprising displaying the result set in a text format.

12. The method of claim 6, wherein the generating the metadata comprises generating a textual description for each of the one or more events of the computer simulation.

13. The method of claim 6, further comprising:
generating and storing a second metadata corresponding to the replay data in a binary file along with the searchable text file;
wherein the second metadata comprises information regarding the replay data and provides an alternative method of searching for the replay data.

14. An apparatus, comprising:
a processor based system that includes a processor and a memory,
wherein the processor based system is configured to:
generate metadata that corresponds to replay data;
store the generated metadata in a searchable text file;
receive a search request comprising a description of a game event;
search for replay data matching the description of the game event using an index created from crawling through a plurality of searchable text files comprising the textual descriptions of one or more events;
generate a result set comprising one or more replay data having metadata that satisfies the search request; and
receive a selection of one or more of the metadata of the result set;
retrieve the replay data corresponding to the selected one or more metadata; and
play back the retrieved replay data
wherein the replay data is generated in response to an execution of a computer simulation, and
wherein the metadata includes textual descriptions of one or more events that occurred during the execution of the computer simulation;
wherein the textual descriptions of one or more events are at least partially generated during the execution of the computer simulation; and
wherein the computer simulation comprises a computer game.

15. The apparatus of claim 14, wherein the processor based system is further configured to:
retrieve replay data corresponding to each of the one or more metadata of the result set from the database; and
play back the retrieved replay data.

* * * * *